United States Patent
Christensen

(10) Patent No.: US 10,988,133 B2
(45) Date of Patent: Apr. 27, 2021

(54) VEHICLE EXHAUST SOUND CONTROL SYSTEMS AND METHODS

(71) Applicant: Ford Global Technologies, LLC, Dearborn, MI (US)

(72) Inventor: M. Scott Christensen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 16/278,462

(22) Filed: Feb. 18, 2019

(65) Prior Publication Data

US 2020/0262414 A1   Aug. 20, 2020

(51) Int. Cl.
| | |
|---|---|
| *B60W 10/06* | (2006.01) |
| *B60W 20/17* | (2016.01) |
| *B60K 13/04* | (2006.01) |
| *F01N 13/08* | (2010.01) |
| *B60W 10/08* | (2006.01) |
| *B60W 10/02* | (2006.01) |
| *B60W 20/15* | (2016.01) |

(52) U.S. Cl.
CPC ............ *B60W 20/17* (2016.01); *B60K 13/04* (2013.01); *B60W 10/023* (2013.01); *B60W 10/06* (2013.01); *B60W 10/08* (2013.01); *F01N 13/08* (2013.01); *B60W 20/15* (2016.01); *B60W 2510/0657* (2013.01); *F01N 2390/00* (2013.01)

(58) Field of Classification Search
CPC ...... B60W 10/06; B60W 10/08; B60W 20/15; B60W 20/17
See application file for complete search history.

(56) References Cited

U.S. PATENT DOCUMENTS

| | | | |
|---|---|---|---|
| 6,364,807 B1 * | 4/2002 | Koneda | B60W 10/08 477/5 |
| 9,175,660 B2 | 11/2015 | Gussen et al. | |
| 9,566,973 B2 * | 2/2017 | Kanai | B60W 20/15 |
| 2007/0102211 A1 * | 5/2007 | Nozaki | B60K 6/48 180/65.7 |
| 2007/0114082 A1 * | 5/2007 | Nozaki | B60W 10/11 180/65.6 |
| 2012/0203411 A1 * | 8/2012 | Mallebrein | B60W 10/08 701/22 |
| 2013/0271051 A1 * | 10/2013 | Goto | B60W 20/00 318/400.26 |
| 2019/0308640 A1 * | 10/2019 | Miller | B60K 6/48 |

FOREIGN PATENT DOCUMENTS

JP      2017198150 A    11/2017

* cited by examiner

*Primary Examiner* — Stacey A Fluhart
(74) *Attorney, Agent, or Firm* — David B Kelley; Brooks Kushman PC

(57) ABSTRACT

A vehicle propulsion system includes an engine arranged to output a first torque to a driveshaft and an electric motor arranged to output a second torque to the driveshaft. The vehicle also includes an automatic transmission arranged to receive an input torque from the driveshaft. The vehicle further includes an exhaust system to output combustion byproduct from the engine. A vehicle controller is programmed to, during deceleration, cause the engine to apply a negative first torque to increase an audible exhaust system sound. The controller is also programmed to activate the electric motor to output a positive second torque such that the input torque to the automatic transmission does not exceed a transmission torque threshold during deceleration.

19 Claims, 3 Drawing Sheets

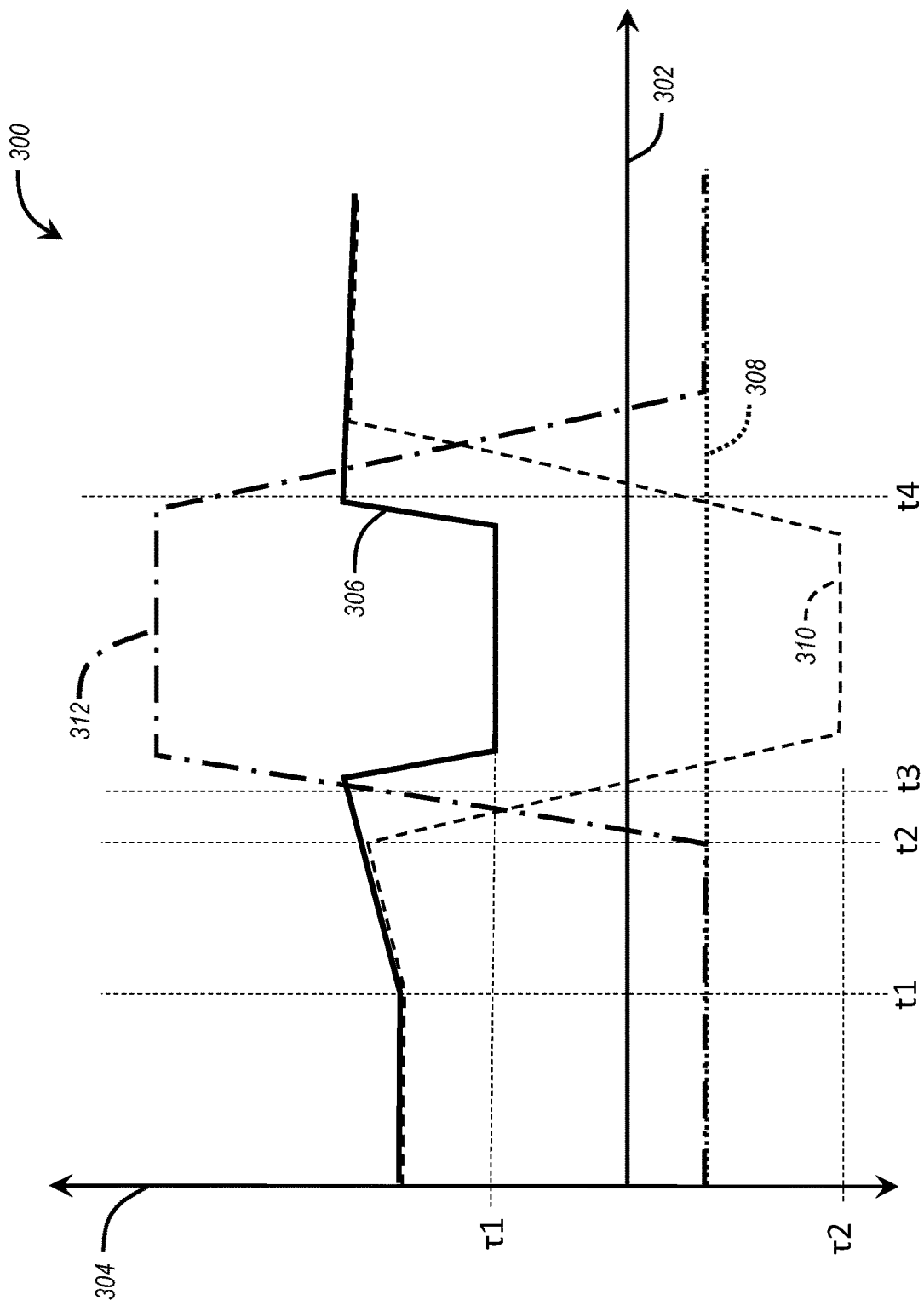

VEHICLE EXHAUST SOUND CONTROL SYSTEMS AND METHODS

TECHNICAL FIELD

The present disclosure relates to a system for controlling a vehicle exhaust sound of hybrid vehicle.

BACKGROUND

Hybrid electric vehicles (HEVs) may include a propulsion system including an internal combustion engine, one or more electric machines to output torque to propel the vehicle. Such vehicle commonly include an automatic transmission having a fluidly coupled torque converter. The torque converter allows for smooth transmissions during torque output changes, and may prevent more harsh output conditions that are associated with performance vehicles.

SUMMARY

A vehicle propulsion system to generate performance exhaust sound includes an engine arranged to output a first torque to an automatic transmission and an electric motor arranged to output a second torque to a driveshaft of the engine. The vehicle propulsion system also includes a controller programmed to, in response to detecting a negative first torque exceeding an engine torque threshold during deceleration, active the electric motor to output a positive second torque.

A vehicle propulsion system includes an engine arranged to output a first torque to a driveshaft and an electric motor arranged to output a second torque to the driveshaft. The vehicle also includes an automatic transmission arranged to receive an input torque from the driveshaft. The vehicle further includes an exhaust system to output combustion byproduct from the engine. A vehicle controller is programmed to, during deceleration, cause the engine to apply a negative first torque to increase an audible exhaust system sound. The controller is also programmed to activate the electric motor to output a positive second torque to prevent the input torque to the automatic transmission from exceeding a transmission torque threshold during deceleration.

A method for controlling a hybrid vehicle exhaust sound includes outputting a negative engine torque upon a driveshaft during deceleration to oppose vehicle motion thereby causing an increase in exhaust sound. The method also includes activating an electric motor to apply positive torque to the driveshaft in response to the negative engine torque exceeding an engine torque threshold, such that an input torque to a torque converter does not exceed and transmission input torque threshold during deceleration.

BRIEF DESCRIPTION OF THE DRAWINGS

FIG. 3 is a plot of propulsion system torque output.

DETAILED DESCRIPTION

Figure 1:
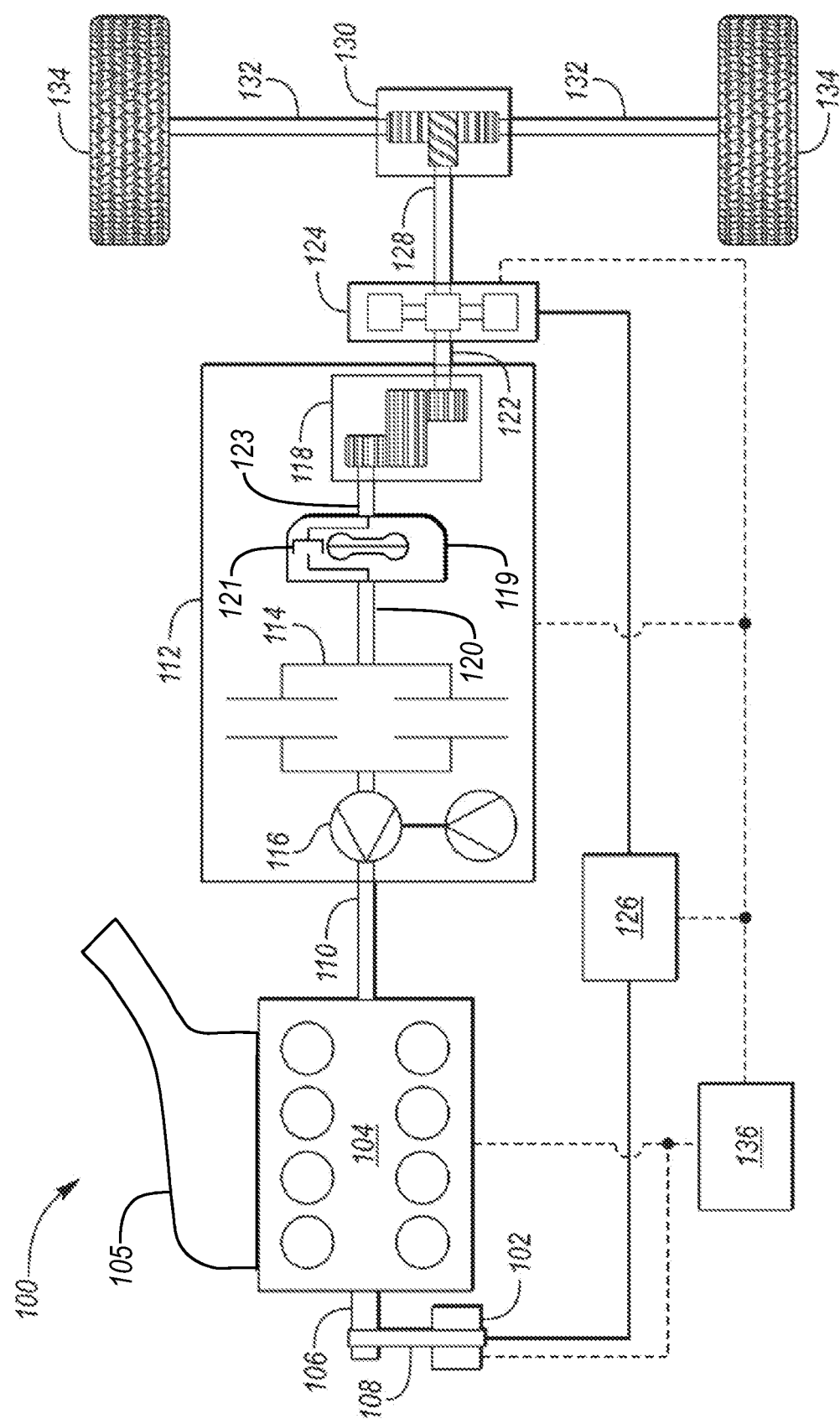
FIG. 1 is a schematic diagram of a vehicle propulsion system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles having automatic transmissions that utilize torque converters provide a known feel during zero input deceleration. Generally, one objective of such vehicles is a smooth feel during deceleration and consistent exhaust audible output. The desired amount of torque passed through the torque converter during such conditions may not allow for large amounts of negative torque at the torque converter input shaft. Conversely, on performance vehicles louder engine exhaust noise is commonly accepted, as well as more aggressive feel during shifting. During deceleration without driver pedal input, much of the desired exhaust note occurs in response to high negative torque produced by the engine. Exhaust noises such as crackling, popping, or "burble," may occur in performance vehicles as the negative engine torque decelerates the vehicle in a fixed gear. While this is desirable in a performance vehicle, for example one having a manual transmission, the phenomena may be unattainable with an automatic transmission having a torque converter. The negative torque generated by this condition may be too strong and thus exceed customer drive quality expectations. Certain customers who drive automatic transmission performance vehicles still desire the audible exhaust effect without harsh deceleration feel related to the negative torque which causes the sound. As such, aspects of the present disclosure include systems and methods that artificially generate such performance vehicle exhaust sounds related to deceleration while still meeting drive feel expectations of an automatic transmission.

In some examples, an electric motor that is rigidly connected to the crankshaft of the engine supplies positive torque during deceleration to allow the engine to imitate the sound caused during aggressive engine braking conditions. Such sounds can be generated during shifts or deceleration to meet customer expectations of a performance exhaust system. Allowing for higher engine negative torque creates the opportunity to generate additional exhaust burble. The net result of applying additional positive torque to the crankshaft is that the input impeller of the torque converter receives the substantially the same torque traditional automatic transmission vehicles during deceleration. While at the same time, the engine produces increased negative torque and a sportier exhaust note during the deceleration. Applying positive electric motor torque maintains necessary impeller torque modulation to downshift during long deceleration without lurching the vehicle, all while generating a modified exhaust noise. The present disclosure describes solutions to generate a sport sound associated with gear ratio downshift during a long deceleration without lurching the vehicle.

Referring to FIG. 1 a "P3" hybrid architecture is presented by way of example having an electric traction motor disposed downstream of the transmission along the driveline. The claimed invention may however, be applicable to other powertrain topologies. In the example of FIG. 1, hybrid vehicle 100 includes an electric motor 102 (e.g., a belt integrated starter generator, or "ISG") applied at a "P0" location to start the engine 104, and selectively supply supplemental torque. In other examples, the ISG 102 may alternatively be coupled to a "P1" location such as to the engine crankshaft (not shown) downstream of the engine. In the example of FIG. 1, the ISG 102 selectively applies torque to a shaft 106 upstream of the engine 104 via a belt connection 108. In other examples, the ISG 102 may be coupled to the engine via a flywheel geared connection. Torque output from the ISG 102 may be applied to start the engine 102 from a nonactive state, to supplement engine output torque when the engine 102 is in an active state, apply negative torque to generate power, as well as apply positive torque when the engine is under negative torque loads during deceleration.

Torque from the engine 104 is output to crankshaft 110 and transmitted to transmission 112. According to at least one example, the transmission 112 includes an internal dual clutch 114 to decouple the downstream powertrain components from the engine 104. The engine 104 can be selectively connected or disconnected to the driveline by closing or opening the dual clutch 114 to allow the engine 104 to be shutdown independent of vehicle operation. The transmission 112 may further include an oil pump 116 connected to the crankshaft 110 to provide oil flow through the transmission 112 for lubrication and hydraulic operation. Operation of the oil pump may contribute to some degree of torque loss across the transmission.

The vehicle 100 also includes an exhaust system 105 to output combustion byproduct from the engine 104. The combustion byproduct may include heat, noise, unburned fuels, and/or other chemical byproduct. While the exhaust system 105 is depicted schematically as a single component, it may include several subcomponents to handle and process combustion byproduct in a number of ways. For example, the exhaust byproduct may be routed through a catalytic converter or other type of filtration, prior to being emitted from the vehicle 100. The audible exhaust byproduct includes the sound of operating the engine 104 and may be routed through a muffler prior to being emitted from the vehicle. The character of the exhaust noise may vary according to the operating conditions and output level of the engine.

The transmission 112 also includes a torque converter 119. Torque output from the clutch 114 is transferred via shaft 120. Therefore the torque converter 119 receives torque from the engine 104 and/or ISG 102 when the clutch 114 is at least partially engaged. The torque converter 119 includes an impeller fixed to shaft 120 and a turbine fixed to shaft 123 connected to a gearbox 118. In at least one example, the gearbox 118 includes internal gearing to allow for the selection of any of a number of available gear ratios for driving.

The torque converter 119 provides a hydraulic fluid coupling between shaft 120 and shaft 123. An internal bypass clutch 121 may also be provided with the torque converter 119 such that, when engaged, the clutch 121 frictionally or mechanically couples the impeller and the turbine of the torque converter 119, permitting more efficient power transfer. The torque converter bypass clutch 36 can be modulated across a range between the engaged and disengaged positions to produce variable slip in the torque converter 119 in addition to the variable slip produced by the hydrodynamic coupling between the impeller and the turbine. Alternatively, the torque converter bypass clutch 121 may be operated as either fully locked or open without using a modulated operating mode depending on the particular application.

The transmission 112 outputs torque via shaft 122 to a propulsion electric motor 124 connected at a "P3" location downstream of the transmission 112. The electric motor 124 may operate as a generator by receiving torque from the engine torque via shaft 122, for example during regenerative braking, and deliver power to the traction battery 126. In other modes, the electric motor 124 may receive power from the traction battery 126 and output propulsion torque via shaft 128. The motor 124 may include an integral gearbox to alter the gear ratio of torque output to the final drive. Throughout this description, the terms generator and motor are used merely as labels to identify these components. Both the ISG 102 and the electric motor 124 are reversible electric machines capable of both converting mechanical shaft power into electrical power, and capable of converting electrical power into mechanical shaft power.

The battery 126 includes two-way electrical connections, such that it can supply energy to power each of the ISG 102 and the electric motor 124. The electric motor 124 uses the energy to provide an assistive torque actuation to the engine 104. The two-way connections also allow the battery to receive and store energy. For example, electrical energy generated from torque absorbed by the electric motor 124 can be transferred to the battery 126 through the two-way electrical connections.

Torque output from the electric motor 124 is passed through shaft 128 to a final drive unit. In the example of FIG. 1, the final drive unit is a rear differential unit (RDU) 130 that includes internal gearing to allocate torque output between side shafts 132 which in turn pass torque to road wheels 134.

Controller 136 may be a single controller or a system of cooperating controllers that regulate operation of the propulsion system of vehicle 100. In some examples a vehicle system controller (VSC) interprets driver requests including gear selection (PRNDL) and an accelerator pedal position signal (APPS) to interpret the driver's intention of wheel torque. In other examples a brake system control module (BSCM) receives driver deceleration requests via brake pedal position signal (BPPS) and outputs commands pertaining to vehicle deceleration. In further examples, a high-voltage battery control module (BCM) monitors battery temperature, voltage, current, state of charge (SOC), and then outputs commands pertaining to maximum allowable discharge power limits and maximum allowable charge power limits.

The VSC may also be programmed to operate as a high-level controller that arbitrates output signals from one or more sub-controllers, and issue final wheel torque targets and torque output commands for each of the torque output devices. The VSC may also determine powertrain operating points to maintain battery state of charge, minimize fuel consumption and deliver the driver-demanded vehicle operation. A torque control (TC) feature within VSC determines a torque split between the engine 104, ISG 102, and electric motor 124. While certain subroutines and/or calculations may be performed by individual sub-controllers, such functions related to propulsion are discussed herein as being encompassed by the functionality of controller 136. In the example of FIG. 1, communicative connections to receive device sensor signals at the controller 136, as well as provide command signals from the controller 136 are illustrated by dashed lines.

Although a hierarchy of controllers is discussed above, other hierarchies of controllers are contemplated without deviating from the scope of the present disclosure. For example, differing configurations and authority relationships are contemplated that would be beneficial for different particular vehicles. Moreover, more or less controllers than those described herein are contemplated, and one or more of these controllers can communicatively cooperate to accomplish certain tasks. Any and all of these controllers or combination thereof can simply be referred to as a "controller."

According to some examples, vehicle controls are provided to allow large negative torque load upon to the engine to influence exhaust sound, while still keeping torque converter impeller torque below a torque threshold to enhance driving smooth feel. The increased negative torque at the engine allowed during deceleration increases the exhaust sound. At the same time, the negative torque spike in the driveline may be isolated from the torque input to the torque converter at the impeller. Thus smooth torque changes may be produced while producing an aggressive exhaust sound output.

Figure 2:
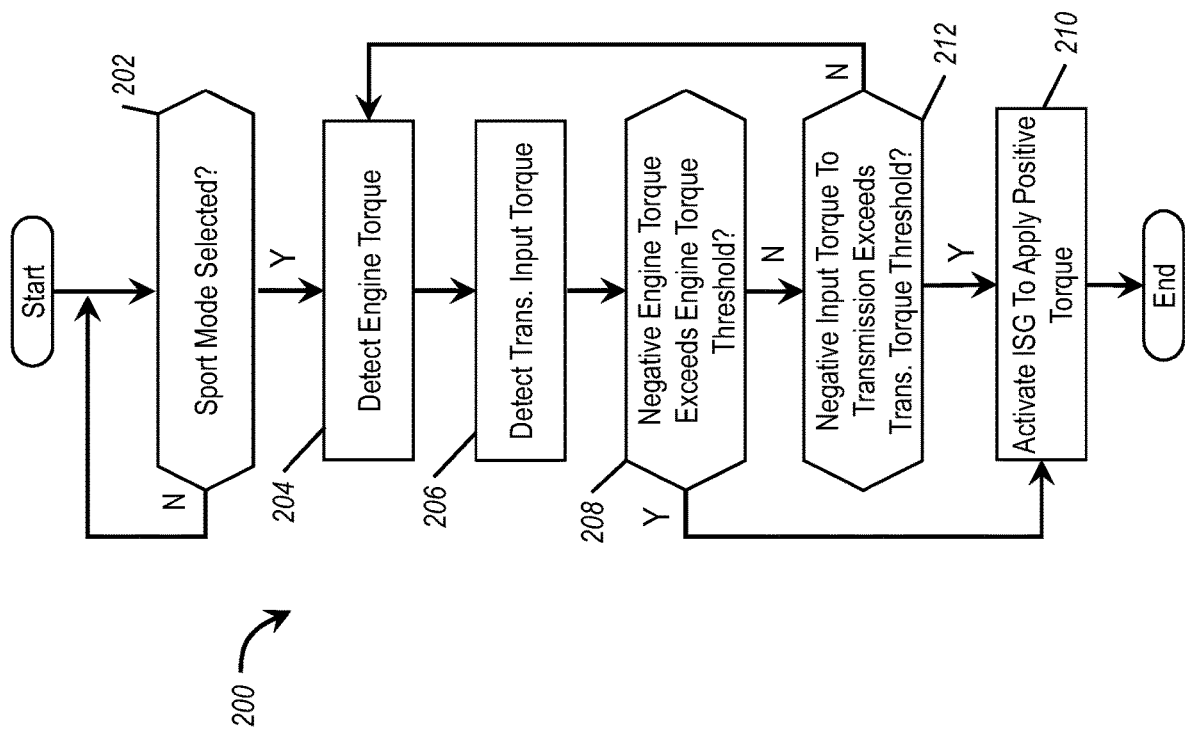
FIG. 2 is a flow chart of an algorithm to control vehicle exhaust audible output.

Referring to FIG. 2, flowchart 200 depicts an algorithm for producing desired exhaust sound. At step 202 the algorithm includes detecting whether the vehicle is in a sport mode. In this way a driver may select whether or not to impart a more aggressive exhaust sound. If at step 202, sport mode is selected, the algorithm includes monitoring torque at several places along the driveline. At step 204 the algorithm includes detecting engine torque. Transmission input torque is monitored at step 206.

During deceleration, if the magnitude of negative engine torque exceeds a predetermined threshold, the algorithm includes applying positive motor torque from the ISG to balance the overall torque delivered downstream to the transmission. While negative engine torque is described by way of example in reference to flowchart 200, it is envisioned that number of different exhaust enhancement criteria may be monitored as criteria to cause an increased magnitude of negative engine torque output, coupled with supplemental positive torque output of the electric motor. According to some examples, the exhaust enhancement criteria may be a magnitude of a negative engine torque exceeding an engine torque threshold, an accelerator pedal tip-out exceeding a tip-out threshold while the propulsion system is in sport mode, and/or an automatic transmission gear ratio downshift while the propulsion system is in sport mode.

If at step 208 negative engine torque exceeds an engine torque threshold, the algorithm includes activating the ISG to apply positive torque to the crankshaft of the engine at step 210 to balance torque delivered downstream to the torque converter. In this way, large negative torque loads may be maintained at the engine to cause a sport exhaust burble indicative of engine braking without inducing a negative torque spike at the torque converter impeller.

If at step 208 negative engine torque does not exceed the engine torque threshold, the algorithm includes assessing the transmission input torque directly. If at step 212 the negative torque input to the transmission exceeds a transmission torque threshold, the algorithm will similarly activate the ISG at step 210 to manage torque passed to the torque converter during deceleration. If at step 212 negative engine torque does not exceed a threshold, no special measures are undertaken with regard applying the positive ISG torque to achieve an aggressive exhaust sound.

Referring to FIG. 3, plot 300 depicts example propulsion system responses during a transmission gear ratio downshift both while in a sport mode operation and while in a non-sport mode operation. Horizontal axis 302 represents time and vertical axis 304 represents output torque in N-m. Curve 306 represents engine torque output while in non-sport mode. Curve 308 represents electric motor output while in the non-sport mode, for example such as an economy mode where the electric motor may engage in regenerative braking to recover energy while decelerating. In the example of plot 300, a shift event is undertaken at time t1 and between t1 and t3 may represent the torque phase of the shift event during which an off-going clutch of the transmission is released, and an on-coming clutch of the transmission is engaged.

At time t3 the transition between clutches is completed, and the transmission gear ratio changes between t3 and t4 during the inertia phase. Toward the start of inertia phase the gear change has only been made physically in the transmission but the change of gear ratio has yet not had the full effect to the engine as there still may be slip present in the on-coming clutch. Thus, engine speed may still be closer to the off-going gear speed corresponding to a torque drop depicted by curve 306. At time t4 the gear shift and corresponding effect on the engine is complete and the engine torque output is recovered to a desired torque output value. It should be appreciated that according to some examples, such as conventional mode and economy mode, the electric motor may apply a constant negative torque as depicted by curve 308. In order to maintain smooth torque transitions during gear shifting, control measures may be implemented to apply an engine torque lower threshold $\tau 1$.

As discussed above, a propulsion system according to the present disclosure may operate to increase an audible exhaust system sound in response to detecting an exhaust enhancement criteria, such as for example, negative engine torque beyond the engine torque lower threshold $\tau 1$, an aggressive accelerator pedal tip out while in sport mode, and/or a transmission downshift event while in sport mode.

With continued reference to plot 300, curve 310 corresponds to an example engine torque output while in sport mode, and curve 312 corresponds to electric motor output while in sport mode. At time t2, in response to detecting the transmission gear ratio downshift while in sport mode, the propulsion system may allow the magnitude of negative engine torque to exceed the conventional engine torque lower threshold $\tau 1$. In the example of plot 300, the engine torque represented by curve 310 is reduced to a negative output torque $\tau 2$. The increased negative output corresponds to a modified audible exhaust output tending to invoke a performance vehicle sound.

In order to maintain a smooth transition in the presence of the large negative engine output torque, the propulsion system modulates the electric motor output to increase positive torque. In this way, torque delivered to the transmission input is managed to remain similar to the conventional operation of an automatic transmission case while generating a desirable performance vehicle exhaust audible output during deceleration.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle propulsion system to generate performance exhaust sound comprising:
    an engine arranged to output a first torque to an automatic transmission;
    an electric motor arranged to output a second torque to a driveshaft of the engine; and
    a controller programmed to cause, in response to detecting an exhaust enhancement criterion during deceleration, the engine to increase a magnitude of a negative first torque and the electric motor to output a positive second torque and to increase an audible exhaust system sound.

2. The vehicle propulsion system of claim 1 wherein the exhaust enhancement criterion is a magnitude of a negative first torque exceeding an engine torque threshold.

3. The vehicle propulsion system of claim 2 wherein the engine torque threshold is based on an input torque to a torque converter of the automatic transmission.

4. The vehicle propulsion system of claim 1 wherein the exhaust enhancement criterion is an accelerator pedal tip-out exceeding a tip-out threshold while the propulsion system is in a sport mode.

5. The vehicle propulsion system of claim 1 wherein the exhaust enhancement criterion is an automatic transmission gear ratio downshift while the propulsion system is in a sport mode.

6. The vehicle propulsion system of claim 1 further comprising a torque converter fluidly coupling the transmission to the driveshaft of the engine, wherein the second torque causes an input torque to the torque converter less than a transmission input torque threshold.

7. The vehicle propulsion system of claim 1 wherein the electric motor is coupled to the driveshaft of the engine via at least one of a belt connection and a flywheel geared connection.

8. The vehicle propulsion system of claim 1 further comprising an exhaust system to output combustion byproduct from the engine, wherein the exhaust enhancement criterion causes the increase in an audible exhaust system sound during deceleration.

9. A vehicle propulsion system comprising:
    an engine arranged to output a first torque to a driveshaft;
    an electric motor arranged to output a second torque to the driveshaft;
    an automatic transmission arranged to receive an input torque from the driveshaft;
    an exhaust system to output combustion byproduct from the engine; and
    a controller programmed to, during deceleration, cause the engine to apply a negative first torque to increase an audible exhaust system sound and activate the electric motor to output a positive second torque to prevent the input torque to the automatic transmission from exceeding a transmission torque threshold during deceleration.

10. The vehicle propulsion system of claim 9 wherein the controller is further programmed to activate the electric motor in response to a negative first torque exceeding an engine torque threshold.

11. The vehicle propulsion system of claim 9 wherein the controller is further programmed to activate the electric motor in response to, while in a sport mode, detecting at least one of a transmission gear ratio downshift and an accelerator pedal tip-out greater than a tip-out threshold.

12. The vehicle propulsion system of claim 9 wherein the electric motor is coupled to the driveshaft of the engine via at least one of a belt connection and a flywheel geared connection.

13. The vehicle propulsion system of claim 9 wherein the transmission includes a torque converter to fluidly couple the driveshaft to the transmission and the input torque to the automatic transmission is received at the torque converter.

14. The vehicle propulsion system of claim 9 wherein the controller is further programmed to deactivate the electric motor in response to a magnitude of the negative first torque being reduced to less than an engine torque threshold.

15. A method for controlling a hybrid vehicle exhaust sound comprising:
    outputting a negative engine torque upon a driveshaft during deceleration to oppose vehicle motion and to increase an audible exhaust system sound; and
    in response to the negative engine torque exceeding an engine torque threshold, activating an electric motor to apply positive torque to the driveshaft such that an input torque to a torque converter does not exceed a transmission input torque threshold during deceleration.

16. The method of claim 15 wherein the positive torque of the electric motor is applied to the driveshaft of the engine via a flywheel geared connection.

17. The method of claim 15 wherein the positive torque of the electric motor is applied to the driveshaft of the engine via a belt connection.

18. The method of claim 15 further comprising deactivating the electric motor in response to a magnitude of the negative engine torque being reduced to less than an engine torque threshold.

19. The method of claim 15 further comprising activating the electric motor in response to, while in a sport mode, detecting at least one of a transmission gear ratio downshift and an accelerator pedal tip-out greater than a tip-out threshold.

* * * * *